Nov. 28, 1933.  F. P. MILLER  1,937,044
FLUSH VALVE
Filed Feb. 4, 1931  2 Sheets-Sheet 1
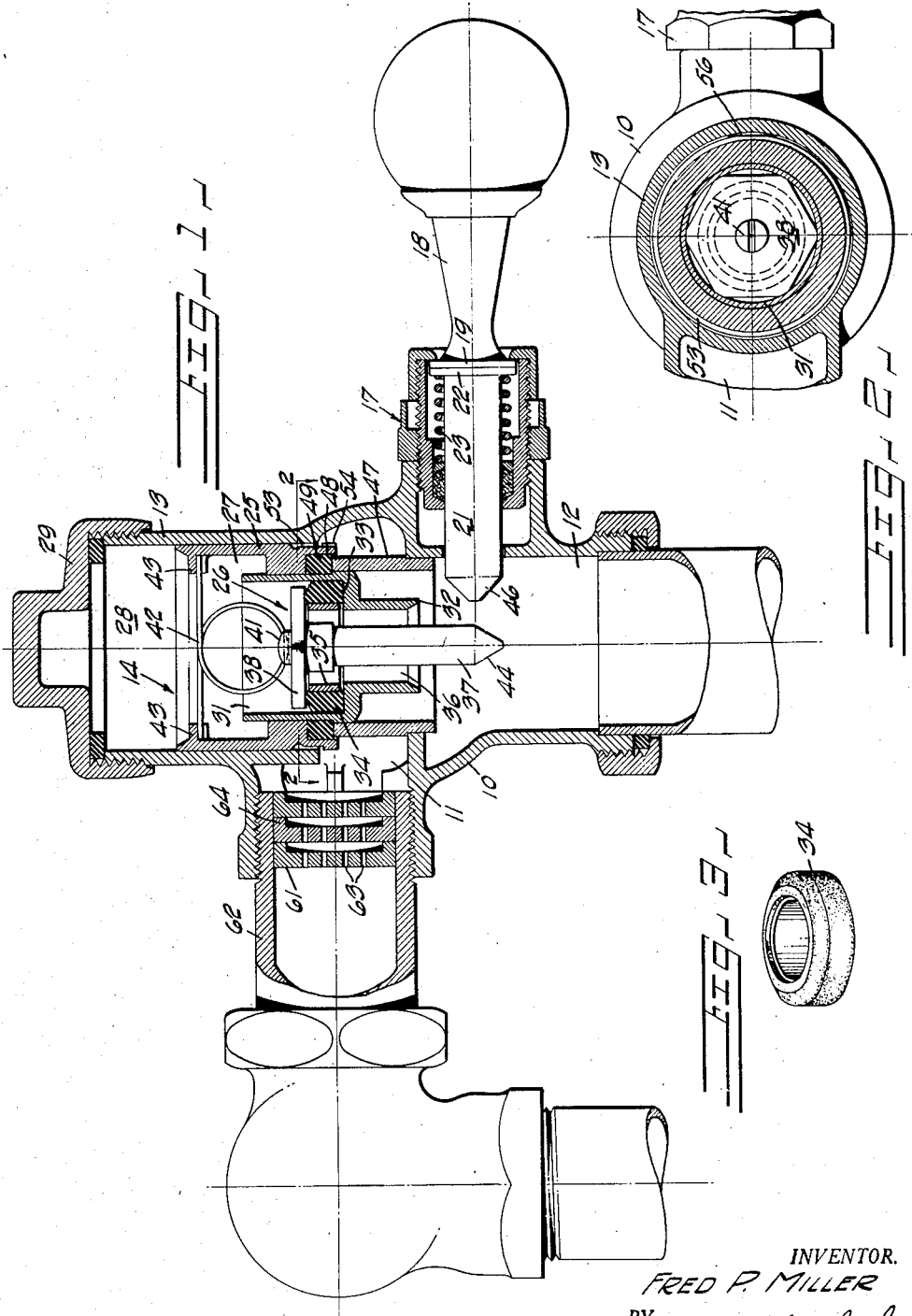
INVENTOR.
FRED P. MILLER
BY
White, Prost, Fisher & Lothrop
ATTORNEYS.

Nov. 28, 1933.    F. P. MILLER    1,937,044
FLUSH VALVE
Filed Feb. 4, 1931    2 Sheets-Sheet 2
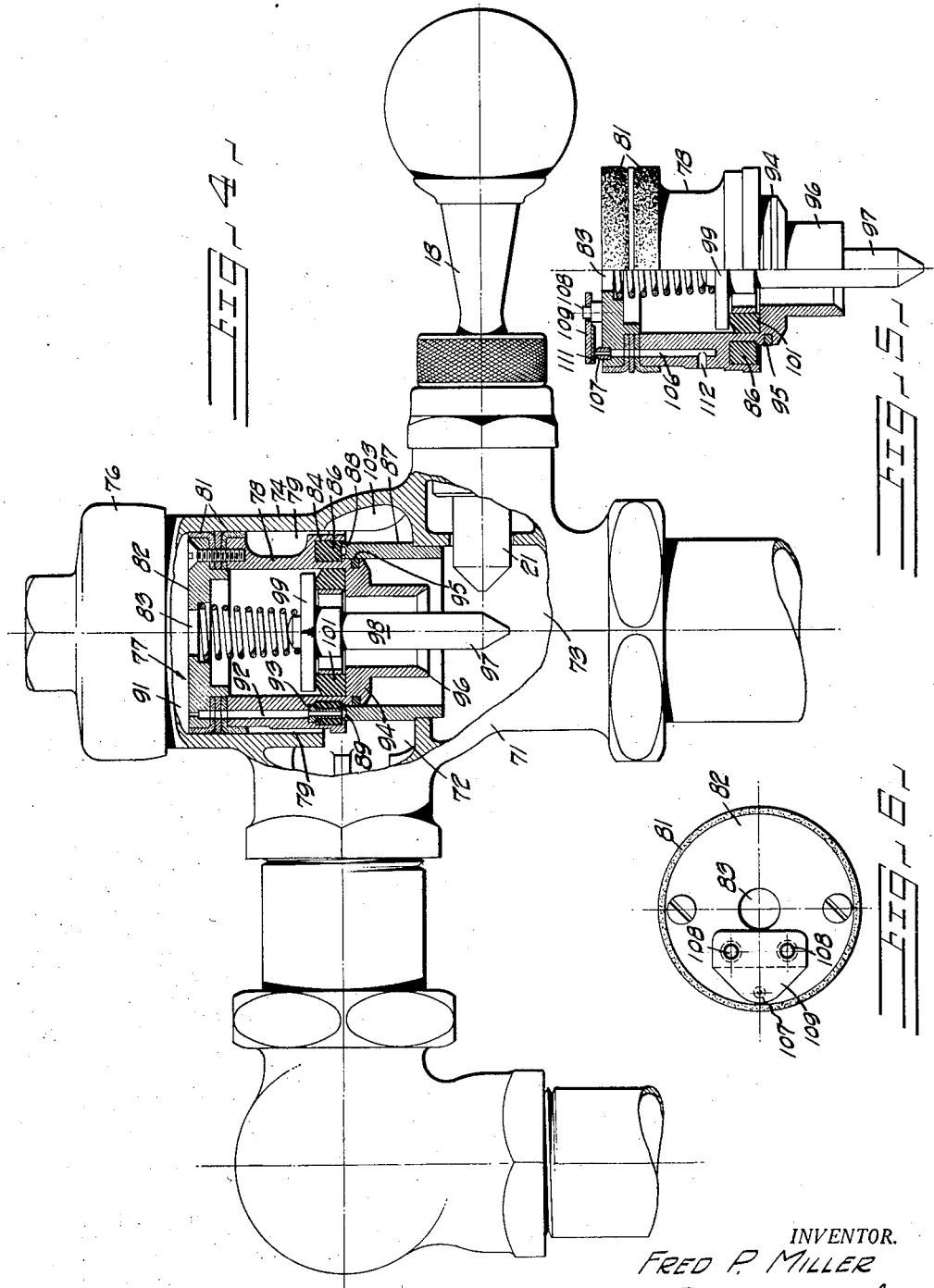
INVENTOR.
FRED P. MILLER
BY
White, Prost, Fisher Lothrop
ATTORNEYS.

Patented Nov. 28, 1933

1,937,044

UNITED STATES PATENT OFFICE 1,937,044

FLUSH VALVE

Fred P. Miller, San Francisco, Calif.

Application February 4, 1931. Serial No. 513,287

7 Claims. (Cl. 137—93)

This invention relates generally to valves such as are commonly used upon water pipes for flushing closet bowls. It is of the fluid pressure type in which, after manual actuation of a lever or button, the valve is opened by fluid pressure and subsequently automatically closed.

It is a general object of the invention to devise a valve of the above character which will give satisfactory and continuous performance under adverse operating conditions, as for example the presence of sediment in the water.

It is a further object of the invention to devise a flush valve which is relatively simple in construction, which can be readily manufactured, and which will give satisfactory operation for a variety of line pressure.

It is a further object of the invention to devise a flush valve in which certain parts, for example parts forming valve seating surfaces, can be readily replaced in the event that they become corroded or worn.

It is a further object of the invention to devise a flush valve which will positively seal the inflow passage with respect to the fluid pressure chamber and the bowl to which the valve is connected, thereby obviating pollution of the water in the main line in the event that the water presure falls below a given minimum value.

Further objects of the invention will appear from the following description in which the preferred embodiments of the invention are set forth in detail in conjunction with the accompanying drawings. It is to be understood that the appended claims are to be accorded a range of equivalents consistent with the state of the prior art.

Referring to the drawings:

Figure 1 is a side elevational view in cross section, illustrating a flush valve incorporating the present invention.

Fig. 2 is a cross sectional detail taken along the line 2—2 of Fig. 1.

Fig. 3 is a detail in perspective illustrating the seating ring for the pilot valve.

Fig. 4 is a side elevational view similar to Fig. 1, partly in cross section, illustrating a modified form of my invention.

Fig. 5 is a side elevational quarter section view illustrating a modified form of fluid operated pistons which can be utilized in the valve construction of Fig. 4.

Fig. 6 is a plan view of the piston shown in Fig. 5.

That modification of the invention illustrated in Figs. 1 to 3 of the drawings consists of a hollow valve casing 10, provided with a lateral inflow opening 11 and a downwardly extending outflow opening 12. Suitable inlet and discharge pipes can be connected to these openings as illustrated. In the upper part of casing 10 there is a cylinder 13 within which a piston 14 is disposed. As will be presently explained the lower portion of piston 14 forms a main valve member adapted to cooperate with a relatively stationary valve seat. To provide an actuator for manually initiating operation of the valve, there is shown a fitting 17 threaded into one side of the valve casing 10. Lever 18 extends into fitting 17 and is provided with an enlarged cam head 19. A slidable rod or plunger 21 is also carried by fitting 17 and is provided with an enlarged head 22 adapted to cooperate with head 19. Spring 23 normally retains plunger 21 in retracted position. As will be presently explained, a pilot valve member 26 is carried by piston 14, and is adapted to be engaged upon actuation of lever 18. Upon such actuation piston 14 moves upwardly by fluid pressure, thus permitting the flow of fluid thru the valve casing to the outflow opening 12. After a sufficient amount of fluid has been permitted to flow to effect a flushing operation, piston 14 is moved downwardly by fluid pressure to close the valve and to discontinue further flow.

The detailed construction of piston 14, with its associated parts which forms a piston assembly, is as follows: The piston body 25 as shown in Fig. 1 is preferably formed of a suitable metal, such as brass, which will not readily corrode. The upper side of the piston presents a cavity 27 to the space 28 above the piston. Space 28 is enclosed by a cap 29 to form a fluid pressure chamber. As a part of the general piston structure, a tube 31, made of suitable non-corrodible metal, has a pressed fit with the body 25 of the piston. A sleeve 32 of reduced diameter depends from the lower end of tube 31, thus forming a relatively flat annular surface 33 at the upper end of sleeve 32. An annular washer like member 34 made of suitable material, such as resilient vulcanized rubber, is removably fitted within tube 31 and seated upon shoulder 33. The upper face of member 34 forms an annular seating surface for a pilot valve to be presently described. A metal reinforcing ring 35 is shown frictionally retained in member 34. It should be noted that member 34 is relatively thick compared to ordinary rubber gaskets, and therefore it will not warp or buckle even though not positively clamped in position.

The port or passageway 36 thru piston 14, formed by tube 31 and sleeve 32, forms a passageway for flow of fluid between the two sides of the piston. It is this port or passageway 36 which is controlled by the pilot valve member 26. Pilot valve member 26 consists of a stem 37 normally extending substantially centrally of port 36, and having a head 38 secured to its upper end. The lower surface 39 of head 38 cooperates with and is adapted to seat upon the annular surface formed upon the upper face of washer like member 34. The contour of head 38 is preferably non-circular, as for example hexagonal as shown in Fig. 2, to permit a flow of fluid, between the head and the inner periphery of tubular member 31, over the upper surface of washer like member 34, and thru passageway 36. A screw 41 can be utilized for attaching head 38 to stem 37, and in order to facilitate retaining the pilot valve member in proper position with respect to the piston during assembly of the valve, I preferably interpose a removable retaining spring 42 between screw 41 and the piston 14. Thus as shown in Fig. 1 retaining spring 42 is formed of a piece of spring wire bent in the form of a loop and having its ends clamped under lugs 43 formed adjacent the upper edge of piston 14. The medial portion of the convolution of the wire engages in the slot provided in the head of screw 41. The lower end portion 44 of stem 37 is preferably conical shaped, and is adapted to be engaged by the inner conical shaped portion 46 of plunger 21.

As has been previously mentioned, piston 14 by its movement controls flow of fluid thru the casing 10. Thus positioned within the valve casing and concentric with respect to piston 14, there is a seat ring 47 made of some suitable non-corrodible metal such as brass, which has a forced fit within the casing to enable its removal for replacement. An annular recess 48 is formed about tube 31 in the lower end of piston 14. Retained within recess 48 there is an annular seating washer 49 which is made of suitable material such as resilient vulcanized rubber. The lower annular surface of washer 48 is adapted to cooperate with the annular seating surface upon the upper annular end of ring 47. It will be noted that ring 47 extends upwardly in front of inflow opening 11, and that the body is formed to provide a pocket 51 surrounding ring 47 in comunication with inflow opening 11. Therefore when the piston 14 is in a raised position to permit flow of water over ring 47 and down thru the interior thereof to the outflow opening 12, the water is diverted upwardly and then caused to flow downwardly. Thus in flowing thru the casing the water is caused to impact against the lower end faces of the piston, thus causing a portion of its kinetic energy to tend to lift the piston. This is an advantageous feature of my valve as will be presently explained.

The piston illustrated in Fig. 1 is of the loose fitting type in which restricted communication is provided between the inflow side of the valve and pressure chamber 28, thru the clearance between the piston and the inner walls of cylinder 13. In operating my valve with unclear water, that is water containing a substantial amount of sediment, foreign particles may lodge between the piston and the adjacent cylinder walls and render action of the valve sluggish. To prevent the foreign particles from finding their way between the cooperating surfaces between the piston and the cylinder, a settling pocket 53 is formed in the peripheral portion of the piston, preferably adjacent the lower portion of the piston as shown in Fig. 1. The lower side of pocket 53 is defined by annular ridge 54, which is of substantially the same diameter as the diameter of the remainder of the piston. As shown in Fig. 2 ridge 54 is flattened as indicated at 56, to provide a port for relatively free fluid communication between the space below the piston and pocket 53. When piston 14 is in its lowermost position as shown in Fig. 1, ridge 54 is below the lower end of cylinder 13, and therefore any foreign particles which may have found their way into pocket 53 are free to settle out into the valve casing. During cyclic movements of piston 14 as will be presently described, there is an upward flow of fluid from the inflow side of the valve thru the clearance or space between the piston and the cooperating walls of cylinder 13. This upward flow must traverse pocket 53, and since this pocket provides a space of considerable area compared to the clearance between the piston and the cylinder, the fluid within this space is maintained in a condition of comparative quiescence, so that foreign particles in the fluid tend to remain in this pocket, and do not tend to continue upwardly with the fluid between the piston and cylinder.

In operating the valve shown in Fig. 1, assuming that water under pressure is applied to inflow opening 11, and that the valve is closed, an operator forces lever 18 to one side thus projecting plunger 21 to displace pilot valve stem 37 laterally. One side of head 38 is thus lifted from its seat, and water under pressure trapped in chamber 28 is exhausted into the outflow opening 12. The water pressure upon the inflow side of the valve thereupon forces piston 14 upwardly to permit water to flow over and down thru the ring 47. As has been previously explained, during flow of water thru the casing the water is deflected upwardly against the lower side of the piston, thus expending considerable kinetic energy tending to continue upward movement of the piston to the limit of its travel and tending to prolong the time required for a complete cycle of operation. By the time the piston has moved to the upper limit of its travel, the pilot valve member 26 has become closed, and flow of water into chamber 28 occurs from the inflow side of the valve, thru the clearance provided between the piston and the cooperating walls of cylinder 13. The piston is thus displaced downwardly until the seating of washer 49 upon ring 47 closes the valve.

By virtue of the fact that the water in flowing thru the valve is deflected upwardly so that its kinetic energy tends to move the piston upwardly, it is possible to use a greater clearance between the piston and the adjacent cylinder walls, without having the action too rapid. It is obvious that a greater clearance precludes jamming of the piston thru accumulation of sediment and permits practical manufacture with a greater range of permissible tolerances.

Considerable noise is frequently caused by operation of a valve of the above character, due to excessive pressure of the water. This noise cannot be minimized by attempting to throttle the water by use of an ordinary valve. However I have found that it is possible to substantially minimize the noise by the use of a labyrinth pressure reducing means interposed between my valve and the inflow pipe connections. Thus as shown in Fig. 1, I have shown a plurality of discs 61 which are positioned within the pipe section 62 connecting with the inflow opening 11 of the valve casing. These discs are provided with elongated nozzles or slots 63 thru which the water must flow. Annular ridges 64 upon the peripheral portions of discs 61 retain the faces of these discs in spaced relationship. The number of discs required depends upon the amount of pressure reduction which must be effected. The use of such pressure reducing means enables operation of my valve practically noiselessly upon relatively high pressure lines.

In Fig. 4 there is shown a modification of my invention in which provision is made for preventing siphoning back into the inflow pipe connections in the event that the water pressure falls below atmospheric. Thus in this case the valve casing 71 is similarly provided with inflow opening 72 and outflow opening 73. A cylinder 74 is formed in the upper part of the casing, and the upper end of this cylinder is closed by cap 76. Piston 77 is disposed within cylinder 74, and reciprocation of this piston controls flow of fluid thru the casing.

Piston 77 consists of a body portion 78, which is formed to provide an annular settling pocket 79 interrupting its peripheral surface. Flow of water between the piston and the adjacent cylinder walls is prevented by the opposed annular cup washers 81 which are retained upon the upper part of the piston body 78 by the clamping plate 82. Plate 82 contains an aperture 83 for flow of fluid. An annular recess 84 is formed in the lower end of body portion 78, and this recess accommodates an annular seating washer 86 made of suitable resilient material such as resilient vulcanized rubber. Ring 87, made of some suitable metal, has a pressed fit within the valve casing and the upper surface 88 of this ring forms a seating surface cooperating with the lower exposed face of washer 86. Surface 88 is preferably interrupted by the annular groove 89.

To provide controlled restricted communication between the pressure chamber 91 above piston 77, and the inflow side of the valve, a port 92 extends down thru one side of the piston, and communicates with the lower face of seating washer 86 thru the flattened metal tube 93. Therefore when piston 77 is in its lowermost position with the lower face of seating washer 86 sealed upon the upper surface 88 of ring 87, port 92 will be sealed with respect to the inflow side of the valve. Therefore if the water pressure upon the inflow pipe connections reduces to atmospheric or below, water cannot be sucked into the inflow pipe conections from pressure chamber 91, nor can air be sucked into the inflow pipe connections from the bowl with which the valve is connected.

The remaining parts of the valve of Fig. 4 are somewhat similar to the corresponding type shown in Fig. 1. Thus the lower portion 94 of the piston body 78 is of reduced diameter to fit within ring 87. To insure positive closing of the piston during the latter part of its closing movement, portion 78 can be provided with a washer or ring 95 of resilient material which seals upon the inner periphery of ring 87, prior to sealing of washer 86 upon the upper face of ring 87. A sleeve 96 depends from portion 94, and surrounds and is spaced from the depending stem 97 of the pilot valve member 98. The head 99 of pilot valve member 98 is adapted to seat upon the upper surface of a resilient washer like member 101. Webs 103 serve to guide the lower portion of the piston and to aid in imparting upward movement to water flowing thru the casing.

In manipulating the valve of Fig. 4, the operator actuates handle or lever 18, thus displacing stem 97 of pilot valve member 98 to one side, to permit water trapped in pressure chamber 91 to exhaust to the outflow side of the valve. Due to fluid pressure to which the lower side of the piston is subjected from the inflow side of the valve, the piston immediately rises and thereupon port 92 is placed in communication with the inflow side. When the piston reaches the upper limit of its movement, at which time the valve is open, pilot valve member 98 has become closed, and fluid flowing thru port 92 from the inflow side of the valve accumulates in chamber 91 and displaces the piston downwardly. Upon subsequent closing of the valve, port 92 is automatically sealed with respect to the inflow side of the valve, thus positively trapping the fluid in chamber 91, and preventing siphoning of this fluid back into the inflow pipe lines or preventing siphoning of air from the bowl which would necessarily follow if the fluid in chamber 91 were siphoned out. The settling pocket 79 operates substantially the same as the pocket 51 of Fig. 1 in that it prevents foreign particles found in unclear water from working their way between the cup washers 81 and the cooperating side walls of the piston cylinder.

As illustrated in Figs. 5 and 6 it is possible to control port 92 of Fig. 4 by means of a check valve independently of seating of the piston upon ring 87. Thus in this instance the bypass port 106 communicates with the fluid chamber above the piston thru a restricted nozzle 107. Positioned upon the upper end of the piston are studs or pins 108, and loosely retained by these pins there is a plate 109. The lower side of plate 109 is covered by a facing 111 of suitable resilient material, such as leather, which seats upon and seals the upper end of nozzle 107. The lower end of port 106 communicates with the inflow side of the valve thru port 112. During upward movement of the piston of Figs. 5 and 6 the force of liquid flowing thru ports 112 and 106 lifts plate 109 to permit the liquid to be discharged in the pressure chamber above the piston. Because of the force with which the liquid is ejected from nozzle 107, the area of facing 111 adjacent the end of this nozzle is cleared of any accumulation of sediment. After the piston has completed its movement plate 109 drops down to closed position by virtue of gravity to close bypass port 106. This arrangement of controlling the bypass port between the inflow side of the valve and the pressure chamber above the piston, is to be preferred as compared to the construction shown in Fig. 4, as it avoids interference with the main seating surface, and at the same time absolutely seals the valve against siphoning back into the inflow side.

I claim:

1. In a fluid pressure operated valve, a hollow valve casing having a cylinder formed in the upper portion of the same and having inflow and outflow openings communicating with the interior of the casing, the inflow opening extending laterally of the axis of the cylinder and communicating with the interior of the casing adjacent the lower end of the cylinder, an annular portion concentric with the cylinder and formed to provide a valve seat, said portion extending upwardly above the lower surfaces of the inflow opening and directly in the path of fluid discharged thru said opening into the casing, a radially disposed web forming a baffle for fluid passing between said annular portion and the valve casing, said web serving to deflect flow of fluid upwardly towards said cylinder, a fluid operated piston in said chamber, a valve member secured to the lower end of the piston and serving to cooperate with the valve seat, the space above said piston constituting a fluid pressure chamber which is in restricted communication with the inflow side of the valve, and pilot valve means for venting fluid from said chamber.

2. In a fluid pressure operated valve, a hollow valve casing having a cylinder formed in the upper portion of the same and having inflow and outflow openings communicating with the interior of the casing, the inflow opening extending laterally of the axis of the cylinder and communicating with the interior of the casing adjacent the lower end of the cylinder, an annular portion concentric with the cylinder and formed to provide a valve seat, said portion extending upwardly above the lower surfaces of the inflow opening and directly in the path of fluid discharged thru said opening into the casing, a radially disposed web forming a baffle for fluid passing between said annular portion and the valve casing, said web serving to deflect flow of fluid upwardly towards said cylinder, a fluid operated piston in said chamber, a valve member secured to the lower end of the piston and serving to cooperate with the valve seat, the space above said piston constituting a fluid pressure chamber which is in restricted communication with the inflow side of the valve, said piston having a fluid opening extending thru the same, a pilot valve for controlling flow of fluid thru said opening, said pilot valve including an operating stem depending from the cylinder and adapted to extend thru said annular seat forming portion, and a sleeve depending from the piston and adapted to surround a portion of said stem in spaced relationship thereto.

3. In a fluid operated valve, a hollow casing having inflow and outflow openings, a cylinder formed within the casing, a piston fitted within the cylinder, the space on one side of the piston forming a fluid pressure chamber, a main valve seat formed within the casing, a valve member cooperating with the seat and connected to the piston, and a port communicating at one end with said chamber and at its other end with the surface on the main valve member which engages said valve seat, whereby said port is sealed when the main valve member is closed.

4. In a fluid pressure operated valve, a casing having fluid inflow and outflow openings, a cylinder formed within said casing, a piston loosely fitted within said cylinder, a valve seat formed below the piston and below the lower end of the cylinder, and a valve member adapted to cooperate with said seat and secured to the lower end of the piston, said piston having a peripheral surface interrupted by an annular settling pocket for sediment in the inflowing fluid, the clearance about said piston forming a bleed by-pass between the space above said piston and the inflow opening.

5. In a fluid pressure operated valve, a casing having fluid inflow and outflow openings, a cylinder formed within said casing, a piston loosely fitted within said cylinder, a valve seat formed below the piston and below the lower end of the cylinder, and a valve member adapted to cooperate with said seat and secured to the lower end of the piston, said valve member being closed upon the seat when the piston is moved to its lowermost position and being opened when the piston moves upwardly under fluid pressure, said piston having a peripheral surface interrupted by an annular settling pocket, said pocket having restricted communication with the space below the piston when the piston is in a raised position and having substantially unrestricted communication with the space below the piston when the piston is in its lowermost position, the sole communication between said pocket and space above said piston being through the clearance about the piston.

6. In a fluid pressure operated valve, a casing having inflow and outflow openings, a cylinder formed within the casing, a piston slidably disposed within the cylinder, means opened and closed by movement of the piston to control flow of fluid thru the casing, said casing together with the piston forming a fluid pressure chamber having restricted communication with the inflow side of the valve, means within the casing for causing the fluid in flowing thru the same to be deflected in an annular path and a web in said path constituting a barrier for deflecting fluid against the piston thereby creating a thrust component tending to urge the piston toward the piston chamber, and pilot valve means serving to control communication between the pressure chamber and the outflow side of the valve casing.

7. In a fluid pressure operated valve, a casing having inflow and outflow openings, a cylinder formed within the casing, a piston having a relatively leaky fit disposed within the cylinder, means opened and closed by movement of the piston to control flow of fluid thru the casing, said casing together with the piston forming a fluid chamber having restricted communication with the inflow side of the valve thru the clearance between the piston and the adjacent cylinder walls, means within the casing for causing fluid in flowing thru the same to be deflected in an annular path and a barrier in said path for deflecting fluid against the piston thereby creating a thrust component tending to urge the piston toward said fluid chamber, and pilot valve means serving to control communication between the pressure chamber and the outflow side of the valve casing.

FRED P. MILLER.